S. TEECE.
HORSE HITCHING DEVICE.
APPLICATION FILED JUNE 22, 1918.

1,321,681.

Patented Nov. 11, 1919.

Inventor
S. Teece

UNITED STATES PATENT OFFICE.

SAMUEL TEECE, OF ENDERBY, BRITISH COLUMBIA, CANADA.

HORSE-HITCHING DEVICE.

1,321,681.  Specification of Letters Patent.  Patented Nov. 11, 1919.

Application filed June 22, 1918. Serial No. 241,377.

*To all whom it may concern:*

Be it known that I, SAMUEL TEECE, a citizen of Dominion of Canada, residing at Enderby, in the Province of British Columbia and Dominion of Canada, have invented new and useful Improvements in Horse-Hitching Devices, of which the following is a specification.

This invention relates to hitching devices for horses and it consists in the novel features hereinafter described and claimed.

An object of the invention is to provide a hitching device of simple and durable structure adapted to be applied to the body of the animal and connected with the harness whereby it is held in position; there being provided a clasp member adapted to grasp one of the legs of the animal whereby the animal is prevented from running but is compelled to stand when the device is applied.

With this object in view the device comprises a band made up of sections and adapted to pass around the body of the animal, straps for connecting the band with the harness saddle, other straps for connecting the band with the gripping strap and a strap connected with the band which carries the clasping member.

In the accompanying drawings:—

Figure 1:
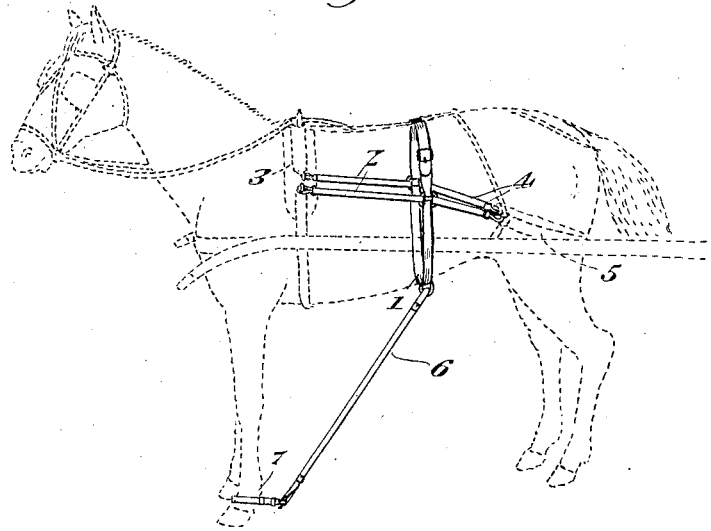
Figure 1 is a side view of a horse with the hitching device applied.
Figure 2:
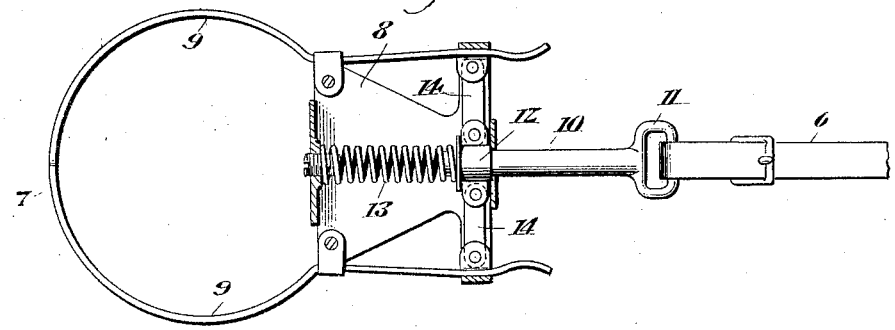
Fig. 2 is a plan view and Fig. 3 a side view of the clasp which engages the leg of the animal.
Figure 3:

The hitching device comprises a band 1 adapted to pass around the body of the animal. The said band is made up of suitable sections and the end portions of the terminal sections may be connected together by means of a buckle or other suitable securing devices. Straps 2 are connected with the opposite side portions of the band 1 and are adapted to be connected at their forward ends by means of hooks with the harness saddle 3 at a point between the shaft tugs and the terrets. Other straps 4 are connected with the band 1 and are adapted to be connected at their rear ends with the end portions of the breeching 5 of the harness. A strap 6 is connected at one end with the lower portion of the band 1 and the said strap carries at its free end a clasp 7 adapted to engage around one of the legs of the animal.

The clasp includes a body or frame 8 having curved arms 9 pivoted thereon. A bolt 10 is slidably mounted in the body 8 at a point between the arms and is provided at its outer end with an eye 11 through which the strap 6 passes. The bolt 10 is slidable longitudinally in the body 8 and carries at its inner end portion a head 12. A spring pressed pin is interposed between the intermediate portion of the body 8 and the head 12 is under tension with a tendency to hold the bolt 10 at an extended position in the body. Links 14 are pivotally connected at their inner ends with the bolt 10 and pivotally connected at their outer ends with the arms 9. Consequently, it will be seen that when the bolt 10 is moved in an inward direction within the body 8 the links 14 will pull the inner ends of the arms 9 together whereby their outer ends are spread. The leg of the animal may then be received between the spread ends of the arms and when the bolt is released the tension of the spring 13 comes into play whereby the bolt is extended or projected with relation to the body and the outer ends of the arms 9 are brought together around the leg of the animal.

Consequently when the device is applied to the animal it is prevented from running but may stand in an erect position and have limited use of its legs. Therefore the animal is prevented from running away when left standing on the street or road.

Having thus described the invention what is claimed is:—

1. A hitching device comprising a base plate, a pair of arms pivotally mounted upon said plate and having corresponding ends curved toward each other, a spring pressed bolt mounted upon said plate, and a connection between said bolt and the opposite extremities of said arms whereby the curved extremities form with said plate and bolt a loop to be attached to the foot of an animal.

2. A hitching device comprising a band, means for connecting the band with harness, a strap connected with the band, a body, a spring pressed bolt slidably mounted in the body and connected with the strap, arms pivoted on the body and links pivotally connecting the arms with the bolt, said body and its associated parts forming a loop to be attached to the foot of an animal.

In testimony whereof I affix my signature.

SAMUEL TEECE.

Copies of this patent may be obtained for five cents each, by addressing the "Commissioner of Patents, Washington, D. C."